Nov. 18, 1941.   S. OLSEN   2,263,099
MEANS FOR TREATING GRANULAR MATERIAL
Filed Oct. 31, 1940   2 Sheets-Sheet 1
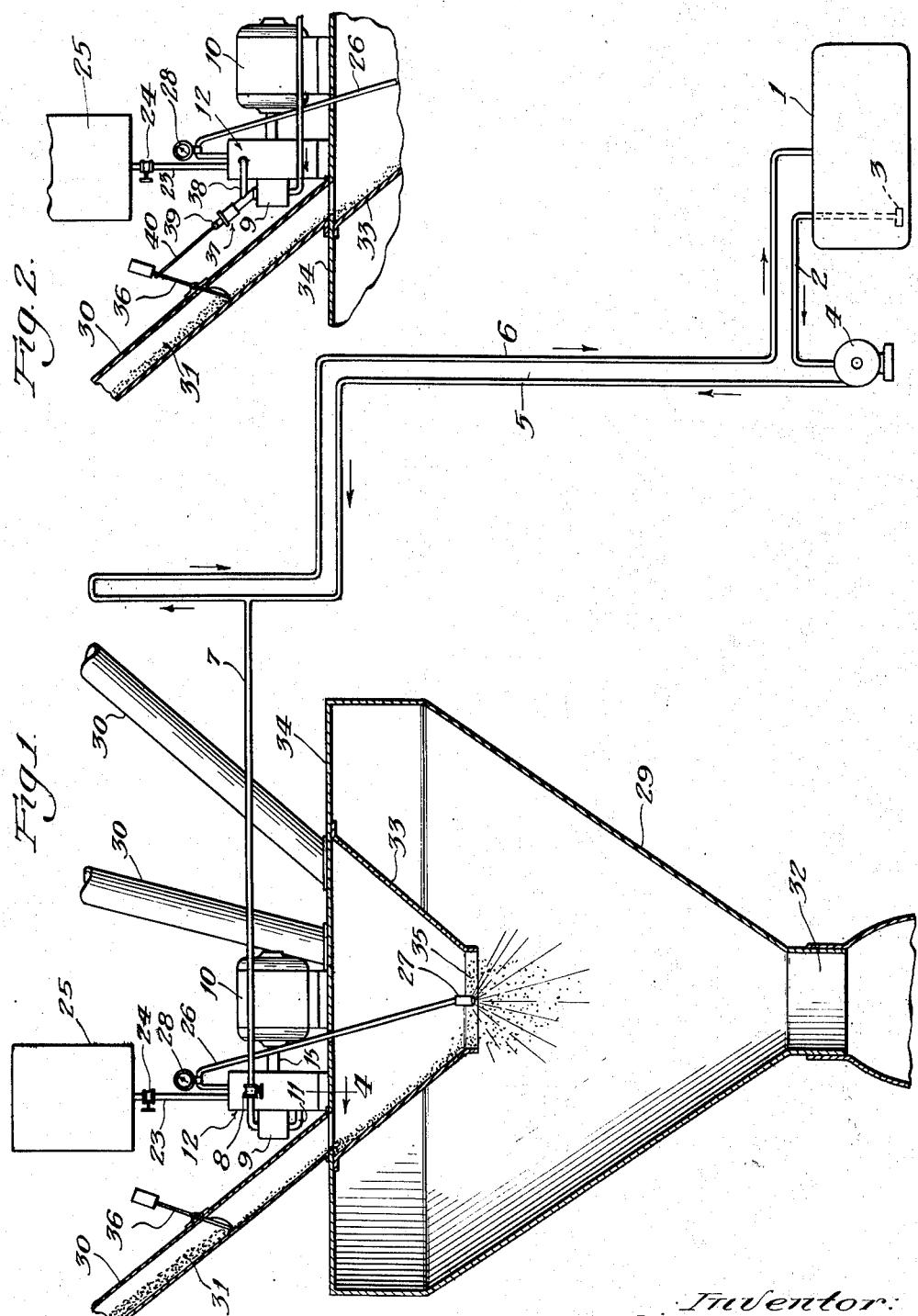
Inventor:
Sigurd Olsen,
By: Lee J. Gary
Attorney.

Nov. 18, 1941.                    S. OLSEN                    2,263,099
                    MEANS FOR TREATING GRANULAR MATERIAL
                    Filed Oct. 31, 1940              2 Sheets-Sheet 2
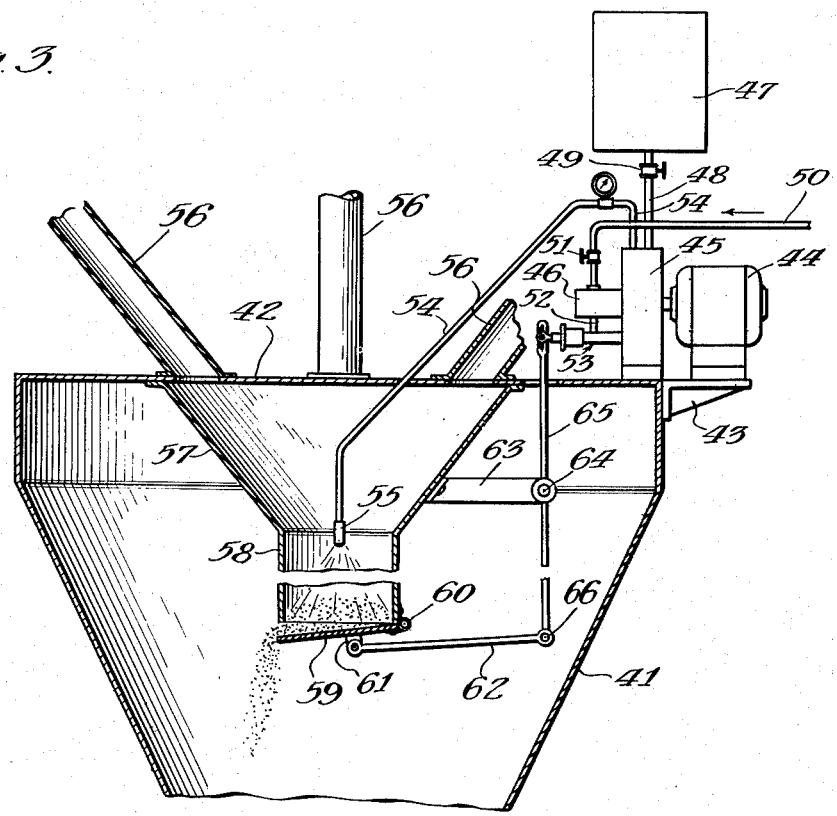
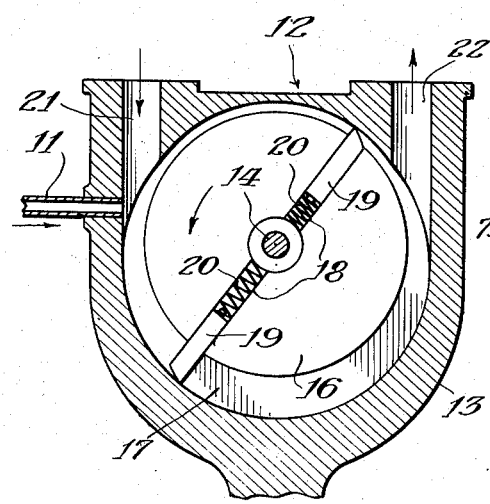
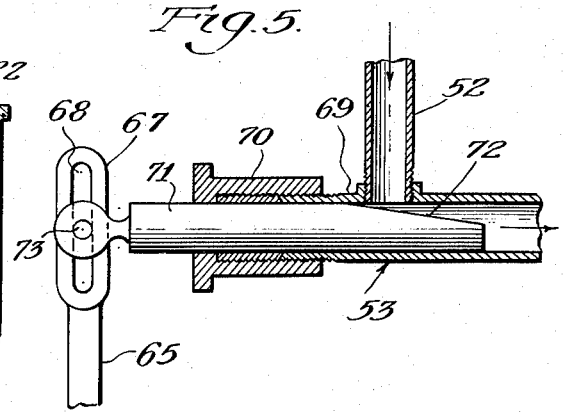
Inventor:
Sigurd Olsen,
By: Lee J. Gary
Attorney.

Patented Nov. 18, 1941

2,263,099

UNITED STATES PATENT OFFICE 2,263,099

MEANS FOR TREATING GRANULAR MATERIAL

Sigurd Olsen, Forest Park, Ill.

Application October 31, 1940, Serial No. 363,722

2 Claims. (Cl. 259—4)

This invention relates to improvements in an apparatus for treating granular or flaky material such as ground mica to suppress dust, the process being characterized in that dust is efficiently suppressed and yet the treated product is not sticky or tacky.

Granular materials such as ground mica or the like have heretofore been treated with oil for the purpose of suppressing dust. The treatment, however, has been inefficient in that much more oil has been added to the mica than is necessary. Portions of the treated material in most instances have been sticky or tacky due to having received too much oil and other portions thereof have been left dry due to the non-uniform distribution of the oil throughout the ground mica mass.

As a feature of my invention less oil per weight of granular material is used than has heretofore been deemed necessary, the oil being uniformly applied to the surfaces of all of the granular particles in relatively thin films, whereby no portion of the granular mass carries too much oil which would cause stickiness, and all portions of the mass carry sufficient oil to efficiently suppress dust.

Briefly described, my invention comprises mixing oil and air in a more or less violent fashion in order to create an oil fog or mist and continuously passing the granular particles through an atmosphere of such oil fog or mist.

Other objects and advantages of my invention will be apparent from the accompanying drawings and following detailed description.

In the drawings,

Fig. 1 is a diagrammatic elevational view, partly in section, of suitable apparatus for carrying out my invention.

Fig. 2 is a fragmentary view of a slight modification of apparatus.

Fig. 3 is a similar view of another modification of apparatus.

Fig. 4 is a sectional view of the air-oil mixing device, taken on line 4—4 of Fig. 1.

Fig. 5 is a detailed sectional view of a valve employed with the modification of my invention shown in Fig. 3.

Referring in detail to the drawings, 1 indicates a tank for containing oil which is adapted to be employed in my process. A pipe 2 connects into the upper portion of tank 1 and extends downwardly into the interior of the tank. A filter 3 is mounted on the lower end of the pipe 2 within the tank 1 and is adapted to filter the oil passed from the tank through the pipe 2. The opposite end of pipe 2 is connected to a motor driven pump 4, the pipe 2 serving as the intake for said pump whereby oil can be withdrawn from tank 1. A pipe 5 is also connected to pump 4 and comprises one side of a looped header, the opposite side comprising pipe 6 which connects into the upper portion of tank 1.

The arrangement is such that the motor driven pump 4 withdraws oil from tank 1 and circulates the same through the headers 5 and 6, the oil returning to tank 1 through the pipe 6. In practice the motor driven pump 4 and tank 1 may be located in the basement of the plant and the headers 5 and 6 may run to the various points to which the oil is to be delivered.

A branch pipe 7 connects into header 5, a hand operated valve 8 being interposed in pipe 7. The opposite end of pipe 7 connects into a centrifugal pump 9 which is driven by motor 10. The pipe 7 comprises the intake for the pump 9. A pipe 11 comprises the discharge for pump 9, said pipe being connected at its opposite end to a mixer 12.

It is to be understood, of course, that as many branch pipes as desired may be connected into the header system, depending upon the number of treating units which are adapted to be employed.

Referring particularly to Fig. 4, a sectional view of the mixer 12 is shown. The mixer comprises a casing 13 through which a shaft 14 extends. The shaft 14, at one end connects with shaft 15 of motor 10 and at the opposite end connects with the rotor shaft of the centrifugal pump 9. A rotor 16 is mounted upon shaft 14 within the casing 13, the rotor 16 being cylindrical in shape. The interior space 17 within the casing 13 is provided with curvilinear surfaces, the curvature of the major portion of the defining wall of the space 17 being eccentric with respect to cylinder 16. A pair of diametral slots 18 is provided in cylinder 16, a blade 19 being slidably positioned in each of the slots. A coil spring 20 is positioned at the base of each of the slots and functions to urge the blades 19 in a radially outwardly direction.

The mixer 12 is provided with an air inlet 21 in addition to the oil inlet pipe 11, and said mixer is also provided with a vapor discharge opening 22. In operation, rotation of the cylinder 16 causes a vacuum to be created in that portion of the space 17 in which the oil outlet pipe is connected and into which the air inlet opening communicates. Consequently, upon rotation of the rotor 16, a mixture of air and oil is discharged through the discharge opening 22.

A pipe 23 controlled by valve 24 connects into the air inlet 21 of the mixer 12. The pipe 23 at its opposite end connects into the lower portion of a container 25 in which oiled steel wool or other air filtering medium may be positioned. A pipe 26 connects with the discharge 22 and is provided at its opposite end with a spray head 27. A gauge 28 connects into pipe 26 and is adapted to measure the pressure of the vapor in said pipe. The oil employed in my process is of the relatively non-volatile, non-drying type, having a relatively low viscosity. By appropriately controlling the proportion of oil and air fed to the mixer 12, by properly manipulating the valves 8 and 24, a fog or mist of atomized particles of oil may be discharged from the mixer and through the head 27. Consequently, in the vicinity of the head 27 an atmosphere of oil, fog or mist is established. It is through this atmosphere that the granular material to be treated is passed as will be hereinafter more fully described.

Although my invention is applicable to many types of granular materials, it is ideally adapted for use in conjunction with ground mica and, hence, my invention will be described in conjunction with its use in suppressing dust on ground mica.

In the grinding of mica to produce granular particles or flakes which are adaptable for use in the roofing industry, as fillers for paints, or for purposes of heat insulation, the micaceous rock is ground and subsequently screened to divide the ground bulk into various mesh classifications. A hopper 29 which is of substantially conical shape is provided for each class of ground mica. A plurality of conduits 30 deliver ground mica as at 31 from the screens to the hopper 29. The hopper 29 is provided with an opening 32 at its lower constricted end whereby the mica discharged into the hopper 29 may be passed to appropriate bins or bags.

In carrying out my invention a secondary hopper 33 is secured to the upper closure 34 of the main hopper 29, the secondary hopper being substantially conical in shape and being provided with a discharge opening 35 at its lower constricted end. The motor 10 together with mixer 12 and pump 9 may be mounted on the closure 34 and the vapor discharge pipe 26 may pass through said closure, positioning the spray head 27 adjacent the discharge opening 35.

In operation, the mica passed through conduits 30 from the screens is first passed into the hopper 33 and discharges therefrom through the opening 35. In passing through the constricted opening the mica particles are compelled to pass through the atmosphere of oil fog or mist produced in the vicinity of the opening 35 by the spray head 27. The particles or flakes of mica in thus passing through the oil fog, have a microscopically thin film of oil deposited upon their surfaces. This film is sufficient to suppress dust but is not sufficiently thick upon the mica particles to cause the particles to adhere to each other. In addition, all of the mica particles must pass through the atmosphere of oil fog and in doing so they pass through said atmosphere as detached discrete particles. Hence, the desired film is deposited upon the surfaces of each of the particles.

In each of the conduits 30, a damper 36 may be positioned whereby the rate of flow of mica 31 through the conduits can be controlled. In order to properly coat the particles of mica the flow of the mica through the conduits 30 is correlated with the discharge of vapor from the head 27. As the flow of mica increases, of course, the flow of vapor must increase in proportion. As has been hereinbefore described by properly manipulating valves 8 and 24, the density of the vapor, that is, the proportion of oil to air may be controlled.

Referring particularly to Fig. 2, a slight modification of my invention is illustrated. In Fig. 2 the same reference numerals will be employed to designate identical apparatus described in conjunction with Fig. 1 and for purposes of clarity additional reference numerals will be applied only to those portions of the device which differ from the apparatus shown and described in conjunction with Fig. 1.

In this form of my invention, a valve 37 is interposed in pipe 38 which leads from the pump 9 to the mixer 12. The valve 37, as will be hereinafter more fully described in conjunction with Fig. 5 of the drawings, is provided with a movable plunger 39 which, when moved outwardly, permits an increase in the passage of oil from the pump 9 to the mixer 12 and which, when moved inwardly, decreases the rate of passage of oil from the pump 9 to the mixer 12. A link 40 connects the end of the plunger 39 with the damper 36, the operation being such that when the damper 36 is moved to increase the flow of mica through the conduit 30, the plunger 39 is moved outwardly thus increasing the flow of oil from the pump 9 to the mixer 12. Of course, in order to have the proper vapor density at the spray head when the mica-oil relationship is changed, the valve 24 must be appropriately manipulated to increase or decrease, as the case may be, the supply of air to the mixer 12.

In the form of my invention illustrated in Fig. 2, that is, the semi-automatic operation of the mica-oil control, only one conduit is employed and therefore the flow of oil is automatically regulated with the flow of mica passing through said conduit which would be the total amount of mica treated. Referring particularly to Fig. 3, a semi-automatic arrangement is illustrated wherein more than one conduit is employed in conjunction with a single spray head. In this form of my invention a hopper 41 is employed having a relatively conical shape and having an upper closure 42. A support 43 is mounted upon the hopper 41 and carries a motor 44 which drives the rotor of a mixer 45 and a rotor of a pump 46, the mixer 45 and pump 46 being identical in structure with the mixer 12 and pump 9, respectively, hereinabove described.

A filter chamber 47 is positioned above the mixer 45 and connects with the mixer by means of pipe 48 in which valve 49 is interposed. The filter 47 is identical in construction with the filter 25 hereinbefore described. A pipe 50 controlled by valve 51 connects into pump 46, pipe 50 connecting at its opposite end into one of the headers 5 or 6. The pipe 50 serves as an oil intake for the pump 46 and a pipe 52 functions as the discharge for the pump. The pipe 52 connects into a valve 53 whereby the amount of oil passed from the pump 46 to the mixer 45 may be controlled. A pipe 54 is connected to mixer 45 and functions as the vapor discharge pipe from said mixer, pipe 54 carrying at its opposite end a spray head 55, similar to the spray head 27 hereinbefore described.

A plurality of conduits 56 connect into the upper closure 42 of the hopper 41. A secondary hopper 57 is secured to the lower face of the closure 42 and is conical in structure, the secondary hopper being connected to a relatively elongated cylindrical neck 58 which serves as a discharge for the secondary hopper into the main hopper 41. The spray head 55 is adapted to be positioned adjacent the plane of connection between the cylindrical neck 58 and the secondary hopper 57 and is adapted to create an atmosphere of oil fog or mist immediately adjacent this vicinity.

A door 59 is hinged, as at 60, to the mouth of the cylindrical member 58. A lug 61 is carried upon the lower face of the door 59 and a link 62 is pivotally secured to the lug 61. A bracket 63 is carried upon the outer surface of the secondary hopper 57 and serves as a fulcrum, as at 64, for a lever 65. One end of lever 65 is pivotally connected as at 66 to link 62, the opposite end of the lever 65 carrying a head 67 which is provided with a slot 68.

Referring particularly to Fig. 5, the valve 53 comprises a cylindrical pipe 69, upon one end of which a packing gland 70 is threadedly connected. Pipe 52 connects into an intermediate portion of the pipe 69. A plunger 71 is slidably positioned in pipe 69, the inner end of said plunger being tapered as at 72. The outer end of the plunger projects through the packing gland 70 and carries a pin 73 which passes through slot 69. When the plunger 71 is moved inwardly, the tapered portion 72 of said plunger decreases the area of communication between the pipe 52 and pipe 69 and, hence, the passage of oil from pump 46 to mixer 45 is decreased. When the plunger 71 is moved outwardly, the area of communication between pipe 52 and pipe 69 is increased, and the amount of oil passing from pump 46 to mixer 45 is accordingly increased.

In operation, the mica particles are discharged through the conduits 56 into the secondary hopper 57. In leaving the conical portion of said hopper, said particles pass through the atmosphere of oil fog established in the vicinity of the head 55. The mica particles then drop to the upper surface of the door 59. In view of the fact that the passage of particles into the secondary hopper is a continuous operation, the door 59, due to the weight of particles, will be opened a predetermined degree. By means of the lever 65 and linkage 62 the plunger 71 will be moved to a predetermined position depending upon the angular position of the door 59. The angular position of the door 59, of course, is dependent upon the rate at which the particles drop upon the upper surface of the door. In this manner the rate of passage of oil from the pump 46 to the mixer 45 can be automatically controlled and correlated with the rate of passage of the mica particles. Of course, the air intake valve 49 must be manipulated in order to secure the proper vapor density whenever a material change in the rate of feed of mica to the secondary hopper 57 occurs.

The cylindrical neck 58 is of sufficient length that the atmosphere of oil fog is created above the mica particles which may accumulate on the upper surface of the door 59. Hence, while the mica particles rest upon the upper surface of the door and before they flow therefrom into the main hopper 41, no additional oil is applied to said particles. The only place wherein said particles receive oil is during their passage through the atmosphere created in the immediate vicinity of the head 55. It can readily be seen that by this arrangement an automatic control is established where more than one conduit feeds mica into the secondary hopper 57.

In treating ground mica in my process, the efficiency of the process, that is the economical uniform coverage of the mica by the oil is strikingly apparent from the fact that as low as one gallon of oil per ton of ground mica can be used and the dust can be effectively laid. As a maximum, about three gallons of oil per ton of ground mica can be used effectively without causing undue adherence of the flakes to each other. The size of the mica flakes which can be efficiently treated ranges from 4 to 90 mesh.

The oil used may be of an asphaltic, naphthenic or paraffine base, having a viscosity at 100° F., of between about 50 and 100 seconds. Preferably the viscosity is between 60 to 80 Saybolt Universal at 100° F. The gravity of the oil ranges between about 22 to 32 Baumé gravity. Of course, oils other than hydrocarbon oils may be used providing that they are substantially non-volatile and non-drying and conform generally to the gravity and viscosity ranges hereinbefore set forth.

Although my invention has been described in conjunction with the treating of ground mica, it is also applicable to other granular materials such as slate granules, saw dust or the like.

I claim as my invention:

1. An apparatus for treating granular material to suppress the dust carried thereon which comprises in combination, a primary hopper to receive granular material, a secondary hopper positioned within said primary hopper, means for passing granular material into said secondary hopper, said secondary hopper being provided with a relatively restricted communicating opening into said primary hopper whereby said granular material passes from said secondary hopper to said primary hopper, a mixer, means for feeding oil into said mixer, means for feeding air into said mixer, means for agitating said oil and air fed to said mixer in a relatively violent fashion, to suspend finely divided particles of oil in the air, a discharge pipe for said mixer, said discharge pipe having a mouth adjacent said restricted communicating opening in said secondary hopper, whereby said mixed oil and air creates an oil fog atmosphere in the vicinity of said communicating opening through which said granular material passes.

2. An apparatus for treating granular material to suppress the dust carried thereon which comprises in combination, a hopper for receiving granular material, said hopper having a restricted discharge opening, means for flowing granular material into said hopper, a mixer remotely positioned with respect to said hopper, means for feeding oil into said mixer, means for feeding air into said mixer, means for agitating said oil and air fed to said mixer in a relatively violent manner to suspend finely divided particles of oil in the air, a discharge pipe for said mixer, the mouth of said discharge pipe being positioned in said hopper adjacent the path of travel of said granular material through said discharge opening out of said hopper, whereby said mixed oil and air creates an oil fog atmosphere adjacent said discharge opening through which said granular material passes, and means for automatically controlling the passage of oil to the mixer in response to changes in passage of granular material through said hopper.

SIGURD OLSEN.